Figure 1:
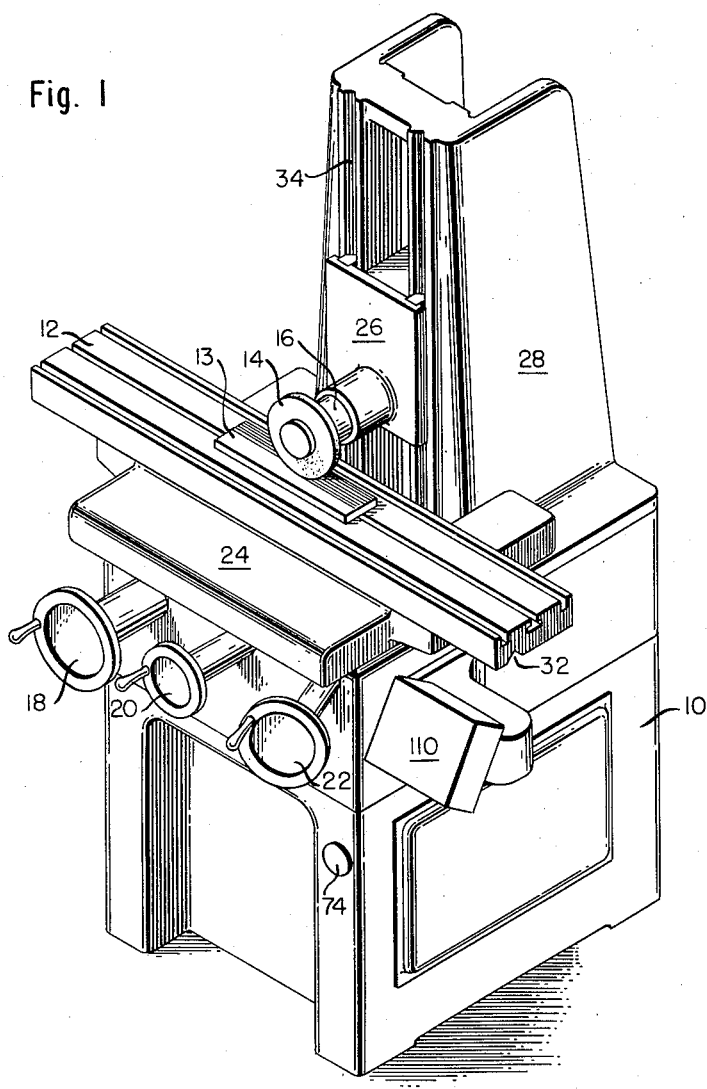

Nov. 11, 1958 — J. W. FARMER ET AL — 2,859,564
MACHINE TOOL

Filed March 22, 1955 — 6 Sheets-Sheet 1

INVENTORS
ALBERT K. SCRIVEN, JR.
JAMES W. FARMER
WALTER P. FERGNANI

ATTORNEYS

Nov. 11, 1958　　　J. W. FARMER ET AL　　　2,859,564
MACHINE TOOL
Filed March 22, 1955　　　　　　　　　　　　6 Sheets-Sheet 2
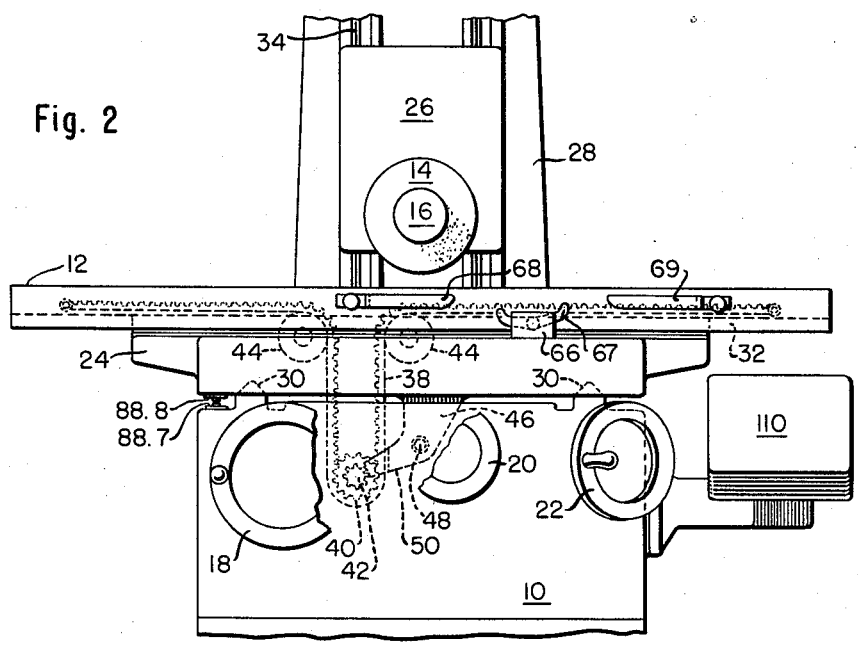
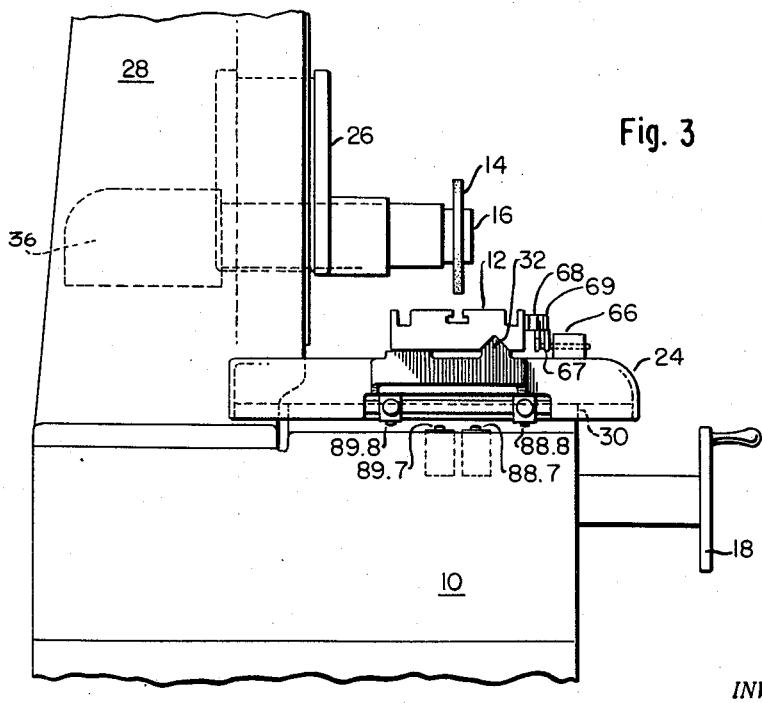
INVENTORS
ALBERT K. SCRIVEN, JR.
JAMES W. FARMER
WALTER P. FERGNANI
ATTORNEYS

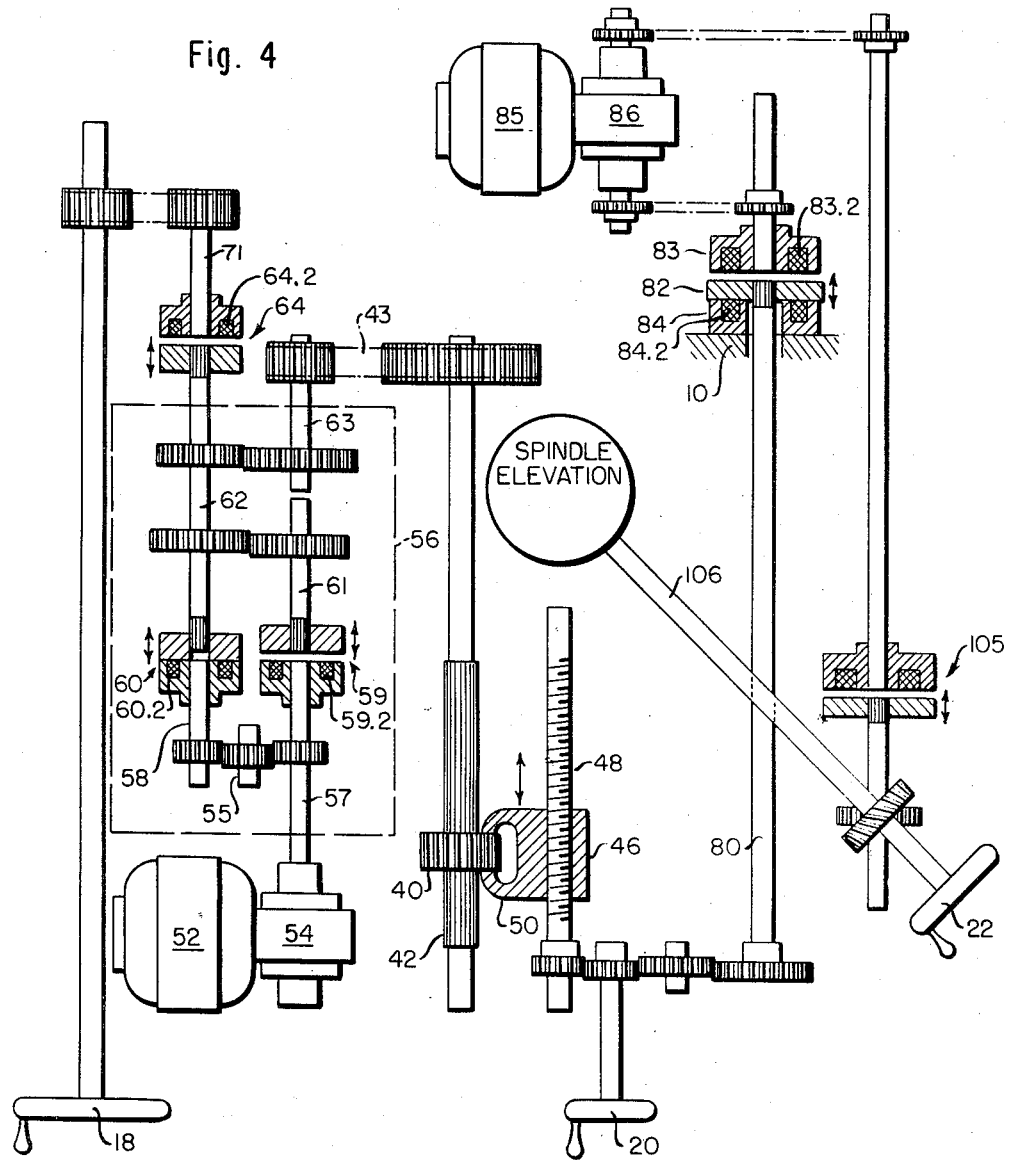

Nov. 11, 1958    J. W. FARMER ET AL    2,859,564
MACHINE TOOL
Filed March 22, 1955    6 Sheets-Sheet 4

INVENTORS
ALBERT K. SCRIVEN, JR.
JAMES W. FARMER
WALTER P. FERGNANI

ATTORNEYS

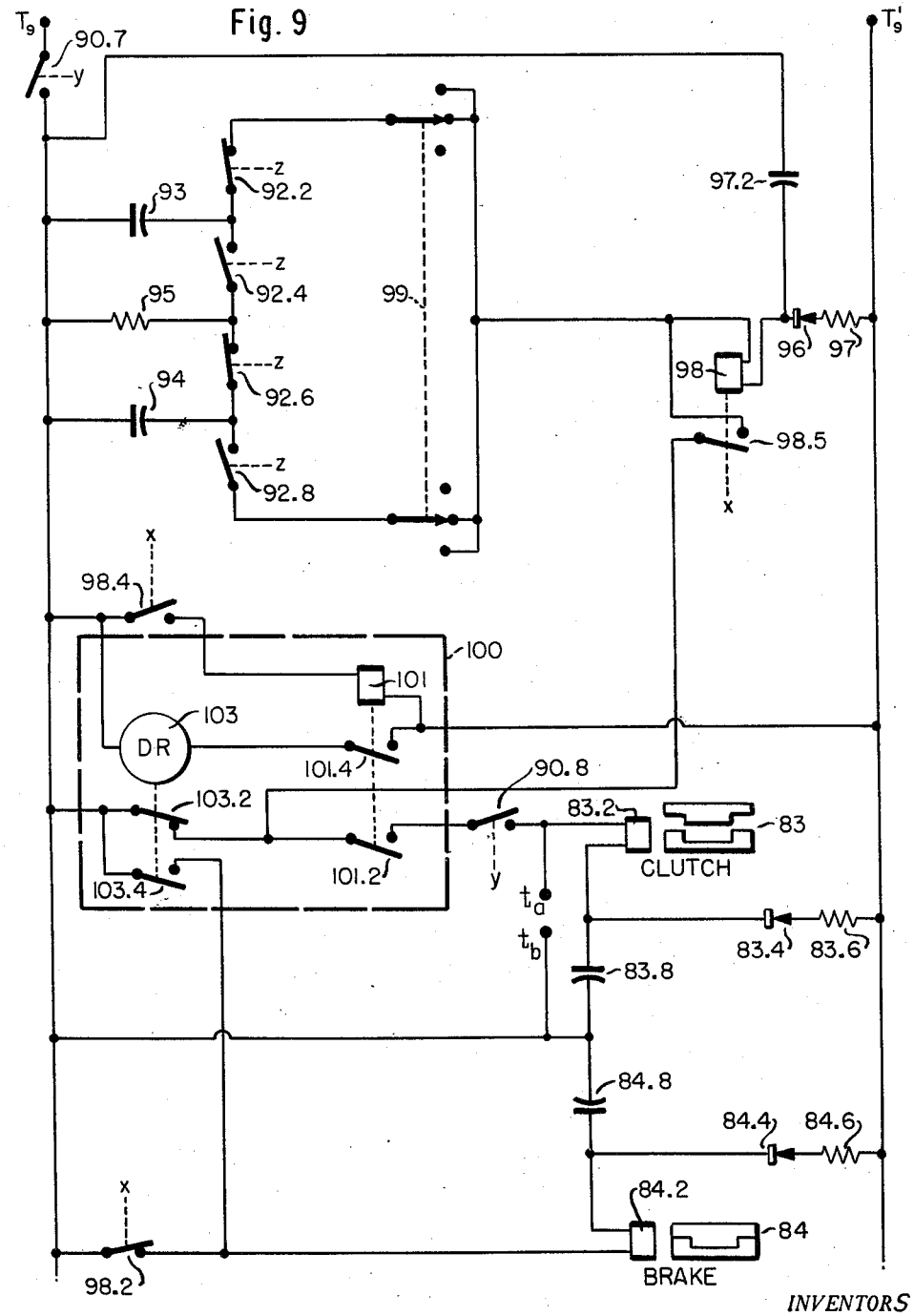

United States Patent Office 2,859,564
Patented Nov. 11, 1958

---

2,859,564

MACHINE TOOL

James W. Farmer, Danvers, and Walter P. Fergnani and Albert K. Scriven, Jr., Beverly, Mass., assignors to Reid Brothers Company, Inc., Beverly, Mass., a corporation of Massachusetts Application March 22, 1955, Serial No. 495,892

3 Claims. (Cl. 51—93)

The present invention relates to machine tools in which the work piece is reciprocated past the tool mechanism, and is described herein as it relates to a surface grinder. It will be understood, however, that its principles and features may also be embodied in other tools of the same general type.

In its general organization, a surface grinder consists essentially of a horizontal rotatable spindle carrying a grinding wheel over a table on which the work piece is held. The table is mounted and driven to reciprocate back and forth and to advance periodically a slight distance laterally so that the entire surface to be ground is exposed to the grinding wheel.

Numerous problems are encountered in the design of surface grinders, particularly with respect to the reversing of the rapidly moving and frequently heavy table and work piece, and the providing of a precisely controlled amount of lateral cross-feed at the desired time in the reciprocating cycle, generally at the end of one or each of the strokes of the reciprocating action.

The present invention is aimed at providing an efficient, simple, and rugged table-driving and cross-feeding mechanism and control system therefor, which is easily controlled with maximum precision and flexibility. In this connection, this invention provides numerous advantages with respect to control over the speed and reversal rate or end shock of the table. Of particular significance is the ease and precision with which cross-feeding is controlled in the novel manner provided by this invention.

With these objects in mind important features of this invention relate primarily to a control system for the cross-feed mechanism by which that mechanism is engaged through a clutch to constantly running means at predetermined time intervals synchronized with the motion of the reciprocating table. In its preferred embodiments the cross-feed clutch is electromagnetically actuated through a relay-controlled circuit actuated by pulses synchronized with the table, and a delay circuit for maintaining the relay energized provides for clutch engagement for the time interval corresponding to the desired amount of cross-feed advancement. It has been found that the cross-feeding of the table may be accurately and easily controlled in this manner.

Other features of the invention relate to the table driving mechanism in which is included a variable speed D. C. motor and a clutch actuated reversing mechanism which preferably includes a pair of electromagnetically actuated table reversing clutches alternately energized through circuits opened and closed at the ends of the strokes of the table.

Figure 6:
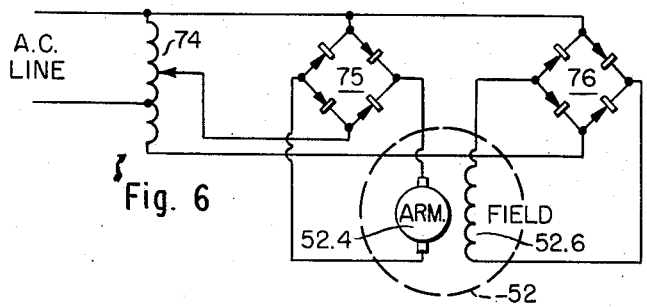
Figure 5:
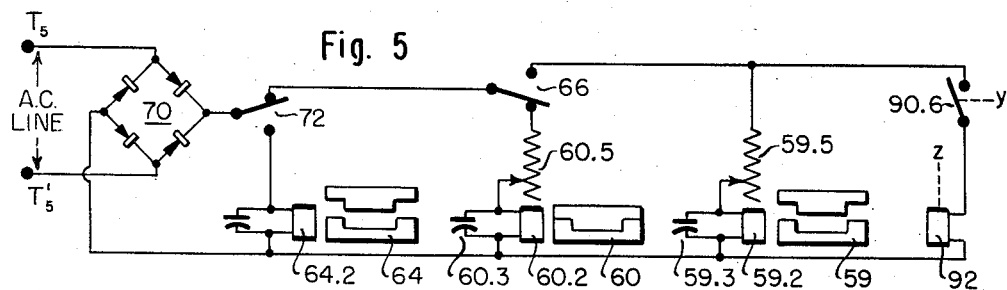
Figure 8:
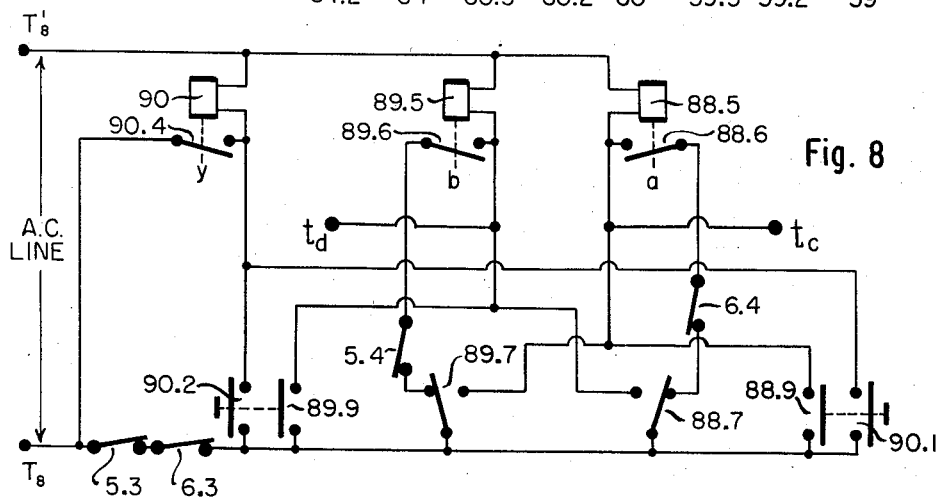
Figure 7:
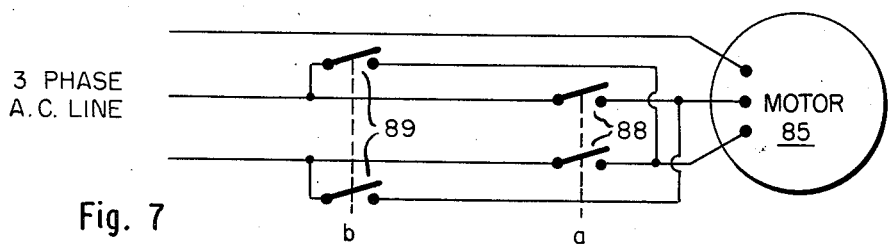
Figure 10:
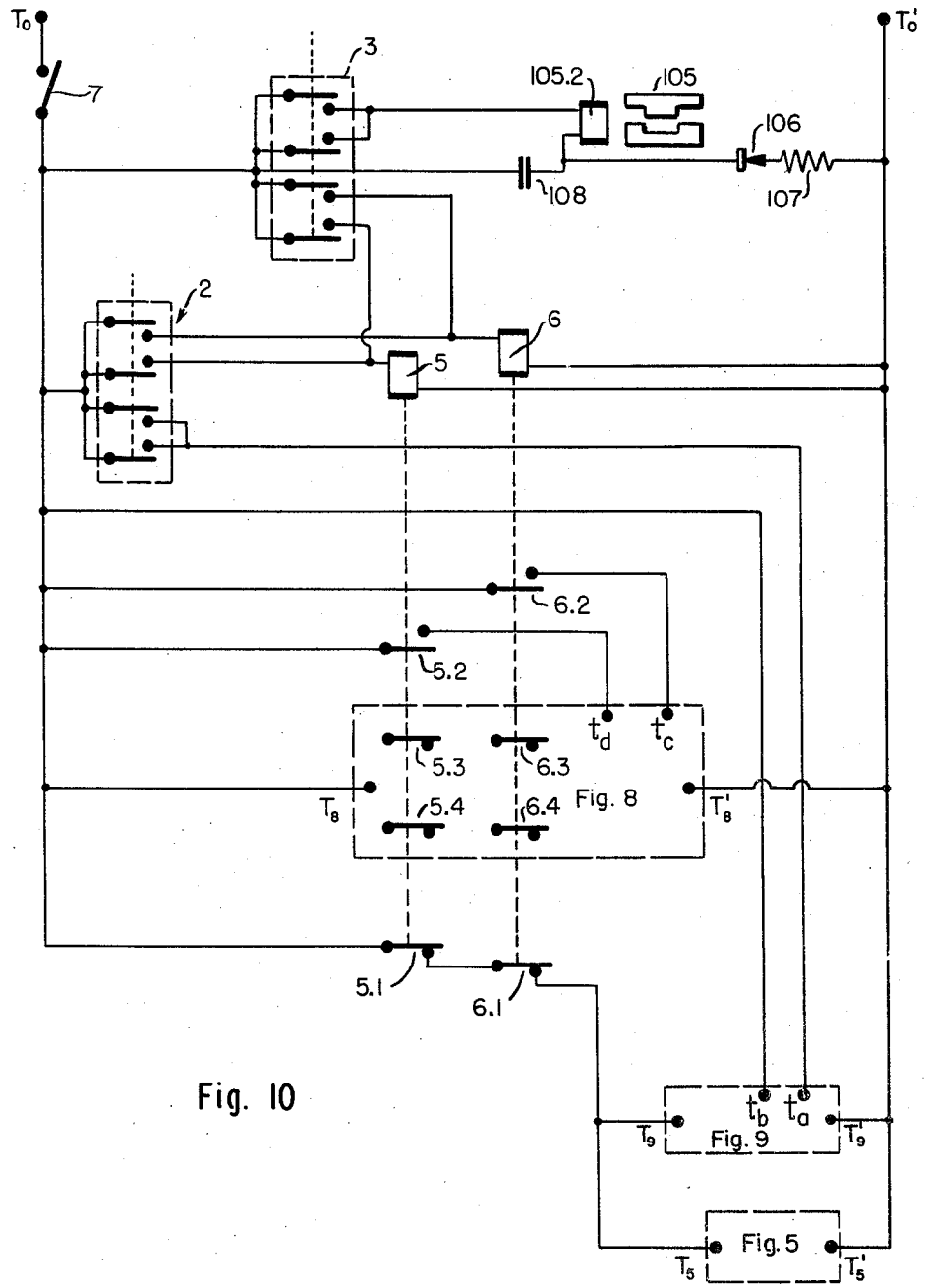

These and other objects and features, residing in the construction, combination and arrangement of parts hereinafter described and claimed, and their advantages, will be obvious to those skilled in the art from the following description and accompanying drawings in which:

Fig. 1 is a perspective view showing the general organization of a surface grinder, Fig. 2 is a front elevation of the surface grinder in which the mechanism for driving the table back and forth is indicated, Fig. 3 is a side elevation of the surface grinder, Fig. 4 is a schematic diagram showing the mechanisms through which the table is driven back and forth and through which it is advanced in cross feed, Fig. 5 is a circuit diagram showing the manner in which the table reversing clutches are energized, and other circuits controlled by switching means associated with the motion of the table, Fig. 6 is a diagram of the power circuit for the table driving motor, Fig. 7 is a diagram of the power circuit for the cross-feed motor, Fig. 8 is a diagram of the cross-feed motor control circuit by which the direction of the cross-feed motor is controlled, Fig. 9 is a diagram of the cross-feed control circuit by which the cross-feed clutch and other components are energized in synchronism with the table motion, and Fig. 10 is a diagram of the operating control circuit through which cross-feeding and other functions may be overridingly controlled manually.

For purposes of illustration, this invention is described in detail as it is embodied in a surface grinder such as shown in Fig. 1. The grinder consists in general, of a supporting base member 10, on which is carried a horizontal movable table 12, for supporting a workpiece 13 and a grinding wheel 14 mounted on a spindle 16 over the table. A cross-slide 24 carrying the table on slide ways 32 running perpendicular to the grinding wheel spindle 16, and supported on cross-slide ways 30 for motion perpendicular to that of the table 12, permits the table to be both reciprocated on the cross slide 24 and moved laterally through lateral motion of the cross-slide. In addition to the driving mechanism automatically controlling them, manual operation of the table and cross slide is also under the control of hand wheels 18 and 20.

The spindle motor 36, spindle 16 and grinding wheel 14 are carried by a grinding head 26 supported through vertical ways 34 on the grinding head column 28 and controlled as to elevation by a lead screw (not shown). Manual control of the elevation of the grinding head is provided through a hand wheel 22.

The driving mechanism for the table consists of a flexible rack 38, conveniently, a toothed steel-cable-reinforced rubber belt, secured at its ends to the underside of the table 12, and driven by a pinion 40 at a depending mid-section located between idler rollers 44 carried by the cross-slide 24. The pinion 40 is driven by a splined shaft 42 which is appropriately mounted in the base member 10. By driving the splined shaft 42 first in one direction and then in the other, the table is caused to reciprocate back and forth.

The cross-slide 24, mounted for motion parallel to the grinding wheel spindle 16, is formed with a downwardly depending nut 46 and is driven by a lead screw 48 appropriately mounted within the base member 10 and threaded to the nut. A pair of arms 50 extending outwardly from the nut 46 engage the pinion 40 and maintain its alignment with the belt on the splined shaft 42 as the cross-slide 24 is moved inwardly or outwardly.

From the general organization described above, it will be seen that the reciprocating motion and the cross-feeding of the table 12 are controlled through the splined shaft 42 and the lead screw 48, respectively, the operation of each of which is described under separate headings below. The mechanism driving the shaft 42 and lead screw 48 are shown as a schematic layout in Fig. 4.

*Table drive mechanism and control circuit*

The table 12 is caused to reciprocate by reversing the direction of rotation of the splined shaft 42 at the end of each table stroke. This is accomplished by means of a parallel shaft reversing mechanism 56 driven by a D. C. motor 52 through a speed reducing gear 54. The reversing mechanism 56 is of more or less conventional construction and consists of an input drive shaft 57 connecting through a clutch 59 to an intermediate shaft 61, and an input idler shaft 58 geared to the input drive shaft 57 through an idler gear 55 and connecting through a clutch 60 with a reversing shaft 62. The reversing shaft 62 is directly geared to the intermediate shaft 61 and rotates in one direction when driven from the input idler shaft 58 when clutch 60 is engaged and in the other direction when driven by the intermediate shaft 61 when clutch 59 is engaged. The output from the reversing mechanism is through an output shaft 63 geared to the reversing shaft 62 and connected by a belt drive 43 to the splined shaft 42.

The clutches 59 and 60 are magnetically actuated through electromagnets 59.2 and 60.2. They are energized, as shown in Figs. 5, 2 and 3, alternately through a S. P. D. T. reversing switch 66 mounted on the cross-feed slide 24 and actuated by a pair of opposed actuating arms 68 and 69 carried in adjustable position by the table 12. The switch actuator, conveniently in the form of a rocker 67 is flipped back and forth by the arms 68 and 69 at the end of each table stroke creating alternating circuits to the clutches 59 and 60, as shown schematically in Fig. 5.

The electromagnets 59.2 and 60.2 controlling the engagement of the table reversing clutches 59 and 60 respectively are each in a circuit including a parallel condenser 59.3 and 60.3 respectively and a series variable resistor 59.5 and 60.5. The clutch circuits connect for alternate energization with the terminals of the limit switch 66, and the entire circuit is powered from a full wave rectifier bridge circuit 70 in the A. C. power line, D. C. having been found superior for energizing the clutches.

The clutches 59 and 60 are preferably of the type designed to slip in picking up the load, and the variable resistors 59.5 and 60.5 in series with them provide an adjustment of the slip and, hence, serve to control the abruptness with which the reversing action takes place. It is thus possible in the improved construction of this invention to vary the end shock associated with reversal of the table 12 during the reciprocating action.

Manual control of the table 12 by the handwheel 18 is provided through a magnetic clutch 64 connecting the reversing shaft 62 of the reversing mechanism 56 with the handwheel 18 through a shaft 71 connected with the handwheel. So that the handwheel 18 is engaged with the table 12 only when the reversing mechanism is not functioning, the electromagnet 64.2 of clutch 64 is energized from the rectifier 70 through the S. P. D. T. toggle switch 72 connected to open the circuits to the reversing clutches 59 and 60 when the handwheel clutch 64 is engaged and to disconnect the handwheel clutch when the reversing clutches are in the circuit. The switch 72 thus serves as a selector switch for "Manual" or "Automatic" operation of the table.

The use of a D. C. motor for driving the table 12 has been found to be particularly advantageous in the ease and simplicity of speed control which it affords, and in combination with the electromagnetically operated reversing mechanism provides a table drive which is flexible, rugged and simple. The D. C. motor 52 is conveniently powered from a rectified A. C. source, connected across a variable auto transformer 74, as shown in Fig. 6. The variable center tap connects with a full wave rectifier bridge 75 from which D. C. power at a controlled voltage is supplied to the armature 52.4, and the field 52.6 is supplied with a constant D. C. voltage through a separate full wave rectifier bridge 76 connected across the windings of the transformer 74. A variable speed constant torque drive is thus provided.

In automatic operation the motor 52 drives the table 12 through the reversing mechanism 56, the reversing switch 66 being actuated to the other position at the end of each stroke to reverse the engagement of the table reversing clutches 59 and 60 and thereby reverse the directions of table travel.

In manual operation, as controlled by switch 72, the clutch 64 connects the handwheel 18 with the splined shaft 42, and disengages both table clutches 59 and 60 so that the splined shaft may be operated by the handwheel.

Cross-feed mechanism and control circuit

At the end of the strokes of the table, during which a path traced by the grinding wheel is ground on the work piece, the table is desirably advanced laterally so that the next stroke is along a different path. Cross-feeding in this manner is caused by laterally shifting the cross-slide 24 by rotating the lead screw 48 the desired amount at the ends of the table strokes. According to the present invention the lead screw 48 is driven by bringing it periodically into clutch engagement with a constantly driven power source for a controlled short interval of time, the occurrence of which is synchronized with the motion of the table, and the duration of which is determined by the amount of cross-feed desired.

As shown in Fig. 4, the lead screw 48 is geared to a cross-feed drive shaft 80, the end of which is splined to a clutch armature 82 located between a magnetic clutch plate 83 and a magnetic brake plate 84 each having actuating magnets 83.2 and 84.2 respectively. The clutch plate 83 is driven by a three phase inductor motor 85 through a speed reduction gear 86 and the brake plate 84 is appropriately secured stationary to the base member 10.

The shaft 80, from which the lead screw is driven, is periodically coupled to the clutch plate by energizing the clutch magnets 83.2 at the desired time in the cycle and for a duration necessary to cause the cross slide 24 to advance (through the nut 46) a proper amount on the lead screw 48. At the end of the cross-feed increment, the clutch magnets 83.2 are deenergized and the brake magnets 84.2 energized to stop the armature 82 from overrunning under its momentum. Conveniently, the brake magnet is energized at all times except when the armature 82 is to be engaged with the clutch plate 83, and thereby holds the cross slide steady except when it is being advanced during cross feeding.

Cross feeding may be in either direction through reversing power connections, as best shown in Fig. 7. Power is conveniently supplied through either of a pair of normally open relay-actuated D. P. S. T. switches 88 and 89 for reversing two of the three power leads and thereby reversing the phase sequence of the power to the motor. For purposes of designation, it may be said that the motor 85 is running to cross feed "in" when switch 88 is closed and to cross feed "out" when switch 89 is closed. The switches 88 and 89 are controlled by a relay control circuit, such as shown schematically in Fig. 8, permitting selective operation of the cross slide in either direction, and providing for reversal at the limits of its travel in and out.

In general, the cross feed motor control circuit consists of a pair of motor control relay electromagnets 88.5 and 89.5 actuating the "in" and "out" switches 88 and 89, as designated by the dashed lines $a$ and $b$, and also actuating normally open holding circuit switches 88.6 and 89.6. A holding circuit for each of the relay magnets 88.5 and 89.5 is provided through the holding circuit switches 88.6 and 89.6 in series with normally closed contacts of SPDT limit switches 88.7 and 89.7 located on the base member 10 and actuated by lugs 88.8 and 89.8 adjustably mounted on one side of the cross slide 24

(see Figs. 2 and 3). The actuating circuits for each of the relay magnets 88.5 and 89.5, through which each of them may be initially energized to complete the holding circuit, is in parallel with the holding circuit and is completed either through push button contacts 88.9 and 89.9, or through the normally open contacts of the SPDT switch included in the holding circuit of the other magnet. Thus initially the cross-feed motor may be started up in either direction by closing temporarily either push button contacts 88.9 to energize relay magnet 88.5 or push button contacts 89.9 to energize relay magnet 89.5. At the end of each cross-feed path the limit switch 88.7 or 89.7 through the normally closed contacts of which the holding circuit for the energized relay magnet 88.5 or 89.5 is made, is actuated to break the holding circuit and to complete through its normally open contacts an energizing circuit for the other relay magnet. The other relay magnet is then held energized through its holding circuit until the other limit switch is actuated.

Associated with the cross-feed motor control circuit shown in Fig. 8 is also a holding relay 90 energized through either of two parallel normally open switches 90.1 and 90.2, each linked to one of the "in" or "out" feed control pushbuttons 88.9 and 89.9 respectively. A holding circuit for relay 90 is provided by switch 90.4 to maintain energization. The function of holding relay 90 is to close control switches in other circuits to permit their functioning only after the cross-feed motor 85 has been started. The connections to these switches are indicated by the dashed lines y, the switches being designated 90.6 (Fig. 5), 90.7 and 90.8 (Fig. 9).

The circuit to the limit switches 88.7 and 89.7, through which power is supplied to the relay electromagnets 88.5 and 89.5, also includes in series a pair of normally closed switches 5.3 and 6.3, the opening of either of which opens the cross-feed motor control circuit to permit independent control over the cross-feed motor for rapid traversing operations. Independent operation of the cross-feed motor relays 88.5 and 89.5 during rapid traversing is afforded through separate power supply connections as indicated at tc and td, and to ensure opening of the holding circuit of the relay 88.5 or 89.5 when independently energized the holding circuit to relay 88.5 includes a normally closed switch 6.4 and the holding circuit to relay 89.5 a normally closed switch 5.4, each of which is selectively opened when the relay associated with it is independently energized manually as described below with reference to Fig. 10.

The control circuit for the cross-feed motor shown in Figs. 7 and 8 then serves to control the directions in which the motor 85 is run. By temporarily closing pushbutton 88.9 and also switch 90.1, relays 90 and 88.5 are energized, and are held energized by their respective holding circuits, and as a result switch 88 in the power circuit to motor 85 is closed. Similarly, closing switch 89.9 and also 90.2 causes relays 89.5 and 90 to be energized as a result of which the phase relationship of the power to the motor is reversed through the closing of switch 89, and the motor runs in the other direction. At the end of each cross-feed stroke, the limiting switch 88.7 or 89.7 in the holding circuit of the energized relay 88.5 or 89.5 is actuated to open that holding circuit and to close an energizing circuit to the other relay, whereupon the motor is reversed.

Energization of the clutch and brake magnets 83.2 and 84.2 by which the cross-feed slide 24 is periodically driven, is under the general control of a time delay relay circuit actuated in synchronism with the table 12 through a synchronizing relay 92 (Fig. 5) energized through one side of the reversing switch 66, in parallel with one of the table reversing clutches, as shown clutch 59. Synchronizing relay 92 controls a pair of normally closed switches 92.2 and 92.6, and a pair of normally open switches 92.4 and 92.8 (as indicated in Fig. 9 by the dashed lines 2) which serve to connect one of two parallel condensers 93 and 94 alternately into a D. C. actuating circuit including a cross-feed control relay 98, and to connect the other condenser across resistor 95. As shown, normally closed switch 92.2 connects condenser 93 into the D. C. circuit through the cross-feed control relay 98, the other normally closed switch 92.6 connecting condenser 94 across resistor 95; and normally open switch 92.8 connects the condenser 94 into the D. C. circuit, the other normally open switch connecting condenser 93 across the resistor 95. Thus whenever the synchronizing relay 92 is energized or deenergized one of the condensers 93 or 94 is connected into the D. C. line and a pulse of current flows during the charging of that condenser. Since actuation of relay 92 is synchronized with the strokes of the table 12, the pulses are similarly synchronized.

So that cross-feeding at the end of either or both the right and left strokes of the table may be selected, the parallel pulse circuits from the condensers 93 and 94 include a pair of linked three position selector switches 99 each having two positions connected into the D. C. circuit and a non-corresponding position open. As shown switch 99 is set to trigger relay 98 at the ends of both strokes, but if moved to the lowest position triggering would occur only when condenser 94 is connected into the D. C. circuit upon energization of relay 92, the circuit to condenser 93 then being open. Similarly in the uppermost position triggering occurs only when condenser 93 is connected into the D. C. circuit upon deenergization of relay 92.

The D. C. circuit through relay 98 is conveniently provided by a selenium rectifier 96 in series with a peak limiting resistor 97, with a condenser 97.2 in parallel with the D. C. circuit.

Cross-feed control relay 98 serves in conjunction with a self-restoring time delay relay 103 to control the circuits to the brake magnet 84.2 and clutch magnet 83.2, such that for a preset time interval after relay 98 is triggered by a pulse corresponding to actuation of the synchronizing relay 92, the brake magnets 84.2 are deenergized and the clutch magnets 85.2 are energized.

The time delay relay 103 is conveniently part of a commercially available time delay relay mechanism, indicated at 100, which includes an auxiliary relay 101 actuating a pair of normally open switches 101.2 and 101.4 immediately upon energization. The delay relay 103 typically includes a delay circuit, such as provided by the plate circuit of a cold cathode gas tube fired after the firing voltage is built up in an R-C delay circuit. The relay coil is typically included in the plate circuit and energized when the tube fires. The timer is preferably variable, as by including a variable resistance in the R-C delay circuit, so that the duration of the cross-feed time interval may be adjusted. A suitable delay relay mechanism is sold by Machinery Electrification, Inc., Northboro, Massachusetts, and designated MEK–1804 by the seller.

In general cross-feed control relay 98 upon energization opens a normally closed switch 98.2 in the circuit to the brake magnet 84.2, closes a normally open switch 98.4 in the energizing circuit to the auxiliary relay 101, and closes a normally open holding switch 98.5 all as indicated by the dashed lines x. The holding circuit for relay 98 is completed through a normally closed switch 103.2 controlled by the delay relay 103. Control relay 98 thus remains energized for the delay period after receiving an actuating pulse.

Actuation of the auxiliary relay 101, through closing of switch 98.4, closes a circuit through switch 101.4 to the delay relay 103 and initiates the timing operation, and also closes a circuit controlled by delay switch 103.2 through switch 101.2 to the clutch magnets 83.2. The clutch 83 is thus actuated upon energization of relay 98 and remains engaged until actuation of the delay relay 103, at which time switch 103.2 opens, opening the holding circuit to the control relay 98, and opening the circuit to the clutch magnets 83.2. At the same time switch 103.4, actuated by the delay relay 103, closes to complete instantly a circuit to the brake magnet 84.2 preliminary to closing of switch 98.2.

The energizing circuits for the clutch magnets 83.2 and the brake magnets 84.2 are each through rectifier circuits, which have been found to give better clutch action, including in series with each magnet a selenium rectifier 83.4. and 84.4 and a peak limiting resistor 83.6 and 84.6, with each circuit bypassed by a parallel condenser 83.8 and 84.8.

Connections to the condenser 83.8 in the clutch magnet circuit, as indicated at *tb*, and to the clutch magnet 83.2, as indicated at *ta*, are also provided so that the clutch magnet 83 may be actuated independently for rapid traversing of the cross slide 24, as described in detail below with reference to Fig. 10.

The handwheel 20 for manually controlling the cross slide 24 connects with a gear train connecting the lead screw 48 with the drive shaft 80.

*Spindle elevation control*

The spindle head 26 is positioned on a vertical lead screw (not shown) which may be driven manually by handwheel 22 or by power from the cross-feed motor 85 and speed reduction gearing 86 through an elevation clutch 105. The clutch 105 is conveniently magnetically actuated, and an appropriate actuating circuit operating in conjunction with an auxiliary control circuit for the cross-feed motor 85 is provided. A typical circuit is described below with reference to Fig. 10.

*Operating control circuit*

The various mechanism control circuits described above are incorporated into an operating control circuit by which the cross-feed slide 24 and spindle head 26 may be caused to traverse rapidly under power by the operation of an independent manual cross-feed traverse control 2 and spindle head traverse control 3. The circuit is shown in Fig. 10 and provides in general for overridingly operating the cross-feed motor 85 in either direction and for engaging the cross-feed clutch 83 or the spindle clutch 105 for the rapid traversing of either, and for inactivating the cross-feed mechanism and the table driving mechanism during rapid traversing.

The circuit runs from power terminals T0—T'0 through a master switch 7 and connects through terminals T8 and T'8 with the cross-feed motor control circuit shown in Fig. 8, and through a pair of normally closed relay actuated switches 5.1 and 6.1 to the cross-feed control circuit shown in Fig. 9 at terminals T9—T'9 and to the table control circuit shown in Fig. 5 at terminals T5—T'5.

The cross-feed traverse control 2 consists of four normally open SPST switches ganged together to a common actuator so that actuation in one direction closes two of the switches and actuation in the other direction closes the other two. Control over the traversing of the cross slide is afforded through a pair of relays 5 and 6, selectively energized through oppositely actuated switches of control 2. Each of the relays 5 and 6 opens one of the normally closed switches 5.1 or 6.1 in the power leads to the cross-feed control circuit (Fig. 9) and the table control circuit (Fig. 5) and also opens one of the switches 5.3 or 6.3 in the cross-feed motor control circuit (Fig. 8). At the same time the cross-feed motor control circuit is brought under the control of one of the relays 5 or 6 by the closing of a switch 5.2 or 6.2 actuated by one of said relays establishing a circuit through *td* or *tc* to one of the motor control relay magnets 89.5 or 88.5, and by the opening of the switch 5.4 or 6.4 in the holding circuit of the electromagnet thus energized.

As will be seen, energizing relay 5 by moving the actuator of control 2 up closes switch 5.2 to energize the motor control relay magnet 89.5 through *td*, and opens the holding circuit to that magnet at switch 5.4 thereby precluding energization of the holding circuit to the other cross-feed motor control relay 88.5 through the circuit which would otherwise exist through the limit switches 89.7 and 88.7. Thus with control 2 actuated up the cross-feed motor 85 is driven to cross-feed "out." Similarly energizing relay 6 by actuating control 2 down closes the circuit through switch 6.2 connecting with terminal *tc*, and actuates relays 88.5 to drive the cross-feed motor 85 "in."

The other two switches of control 2 connect together to provide a closed circuit connecting with terminal *ta* of the cross-feed control circuit (Fig. 9) and to thereby energize the clutch magnet 83.2 to provide clutch engagement between the cross-feed motor 88 and the cross-feed drive shaft 80 so that the cross slide will be driven when control 2 is actuated. It will be noted in this connection that the rest of the cross-feed control circuit is deenergized through the opening of the power leads at either switch 5.1 or 6.1. Connection of the rectifier circuit by-pass condenser 83.8 associated with the actuating circuit for clutch 83.2 is maintained notwithstanding the opening of switch 5.1 or 6.1 through a connection to the line through terminal *tb*.

A spindle head traverse control 83 of generally similar construction to control 2 provides parallel energizing circuits to relays 5 and 6, and through the other two switches a circuit to the elevation clutch magnet 105.2 which operates the elevation clutch 105 to drive the spindle head elevation screw. Elevation clutch magnet 105.2 it will be seen is energized from a D. C. circuit provided by a rectifier 106 and a peak limiting resistor 107 with a condenser 108 in parallel with the D. C. circuit. Actuation of control 3 thus similarly controls the direction in which the cross-feed motor 85 is driven (this motor also driving the traversing mechanism of the spindle head) and causes the elevation clutch 105 to engage so that the spindle elevation drive shaft 106 will be driven in the desired direction to raise or lower the spindle head 26.

The various controls are conveniently mounted on a control panel 110 for convenience and ease of operation of the grinder. These switches are typically:

Spindle motor switch (not shown) in the circuit to spindle motor 36
Table motor switch (not shown) in circuit to table motor 52
"In" feed switch 89.9—90.2 to the cross-feed motor control circuit (Fig. 8)
"Out" feed switch 88.9—90.1 to cross-feed motor control circuit (Fig. 8)
Feed stroke selector switch 99 in the cross-feed control circuit (Fig. 9)
Manual-Automatic Table control switch 72 (Fig. 5)
Cross-feed traverse control 2 (Fig. 10)
Spindle head traverse control 3 (Fig. 10)
Master switch 7 (Fig. 10)

In addition a Table Drive Tension control for adjusting the variable resistors 59.5 and 60.5 to the table clutch circuits (Fig. 5), may also be mounted on panel 110 so that the end-shock caused by the abruptness of the reversal of the table 12 may be readily controlled. The variable transformer 74 (Fig. 6) by which the speed of the table drive motor 52 is controlled is conveniently mounted at the front of the base as indicated.

From the foregoing it will be seen that this invention provides a rugged, reliable, yet relatively simple machine tool control system offering a remarkable degree of efficient push button control, and eliminating many complicated and expensive mechanical features which were difficult to adjust and operate.

Although the invention has been described in detail with reference to its preferred embodiment, it will be appreciated that numerous modifications will readily occur to men skilled in the art and that such may be made without departing from the scope of the invention.

Having thus disclosed this invention and described in detail its preferred embodiment, we claim and desire to secure by Letters Patent:

1. In a machine tool having a table for holding the work piece, means for driving the table back and forth, and cross feed mechanism for advancing the table laterally: a cross feed system for controlling the lateral advancing of the table comprising constantly moving driving means; an electromagnetically actuated clutch for engaging said table advancing means with the driving means; an energizing circuit for said clutch; means responsive to the back and forth motion of the table for producing electrical pulses including a condenser, a D. C. energized charging circuit for charging said condenser and a shunt circuit for discharging said condenser, and switching means alternately connecting said condenser into said charging circuit and into said shunt circuit whereby a pulse is produced in said charging circuit each time said condenser is connected therewith; relay means energized by said charging circuit and responsive to said pulses for closing said energizing circuit; a normally closed holding circuit for said relay; opening means for opening said energizing circuit and said holding circuit; and timer controlled means adapted to actuate said opening means a time interval after said energizing circuit is closed.

2. In a machine tool having a table for holding the work piece, means for driving said table back and forth, and means for advancing said table laterally: a cross feed system for controlling the lateral advancing of the table comprising constantly moving driving means; an electromagnetically actuated clutch for engaging said table advancing means with the driving means; an energizing circuit for said clutch; means responsive to the back and forth motion of the table for producing electrical pulses including a condenser, a D. C. energized charging circuit for charging said condenser and a shunt circuit for discharging said condenser, and switching means alternately connecting said condenser into said charging circuit and into said shunt circuit whereby a pulse is produced in said charging circuit each time said condenser is connected therewith, said switching means being responsive to the back and forth motion of the table; and timer controlled means responsive to said pulses for maintaining said energizing circuit closed for a time interval following said pulses.

3. In a machine tool having a table for holding the work piece, means for driving the table back and forth, and cross feed mechanism for advancing the table laterally: a cross feed system for controlling the lateral advancing of the table comprising constantly moving driving means; an electromagnetically actuated clutch for engaging said table advancing means with the driving means; an energizing circuit for said clutch; means responsive to the back and forth motion of the table for producing electrical pulses including a condenser, a D. C. energized charging circuit for charging said condenser and a shunt circuit for discharging said condenser, and switching means alternately connecting said condenser into said charging circuit and into said shunt circuit whereby a pulse is produced in said charging circuit each time said condenser is connected therewith; electromagnetic switching means energized by said charging circuit and responsive to said pulses for closing said energizing circuit; and timer controlled means responsive to the closing of said energizing circuit adapted to open said energizing circuit a time interval after the closing thereof.

References Cited in the file of this patent

UNITED STATES PATENTS

| | | |
|---|---|---|
| 1,717,326 | Shaw et al. | June 11, 1929 |
| 1,757,929 | Shaw et al. | May 6, 1930 |
| 1,866,212 | Huxford et al. | July 5, 1932 |
| 2,075,369 | Stetler | Mar. 30, 1937 |
| 2,171,519 | Belden et al. | Sept. 5, 1939 |
| 2,340,096 | Woodbury et al. | Jan. 25, 1944 |
| 2,350,229 | Harrington | May 30, 1944 |
| 2,370,701 | Woodbury | Mar. 6, 1945 |
| 2,420,024 | Woodbury | May 6, 1947 |
| 2,581,244 | Donato | Jan. 1, 1952 |